R. E. FLANDERS.
METAL WORKING MACHINE.
APPLICATION FILED DEC. 2, 1915.

1,219,813.

Patented Mar. 20, 1917.
6 SHEETS—SHEET 1.

INVENTOR=
R.E.Flanders
ATTORNEYS

R. E. FLANDERS.
METAL WORKING MACHINE.
APPLICATION FILED DEC. 2, 1915.

1,219,813.

Patented Mar. 20, 1917.
6 SHEETS—SHEET 6.

UNITED STATES PATENT OFFICE.

RALPH E. FLANDERS, OF SPRINGFIELD, VERMONT, ASSIGNOR TO JONES & LAMSON MACHINE COMPANY, OF SPRINGFIELD, VERMONT, A CORPORATION OF VERMONT.

METAL-WORKING MACHINE.

1,219,813.   Specification of Letters Patent.   Patented Mar. 20, 1917.

Application filed December 2, 1915. Serial No. 64,710.

*To all whom it may concern:*

Be it known that I, RALPH E. FLANDERS, a citizen of the United States, residing at Springfield, in the county of Windsor and State of Vermont, have invented new and useful Improvements in Metal-Working Machines, of which the following is a specification.

This invention has relation to metal-working machines, and has for its object to provide certain improvements on machines of the type shown in U. S. Letters Patent No. 910,466, to R. C. Fay, dated January 19, 1909, all as are shown on the drawings described in the following specification and set forth in the appended claims.

Generally speaking, the machine shown on the drawings thus briefly referred to belongs to that class in which the piece of work, on which the several operations are to be performed, is rotated, and if desired is held between centers, and the tool holders or carriers are supported on sliding bars journaled in the bed and have imparted thereto both an axial and a rocking movement for length and cross feeds. The present invention has for its object to secure a greater stability of control of the tools, and thereby to obtain an accuracy in operation such as has not hitherto been possible in machines of this type, to provide for a rapid and easy adjustment of some of the instrumentalities by means of which the machine may be quickly adapted for operation on many different kinds of work, to prevent scoring of the work during the receding or backward movement of the tools, and to provide a number of minor improvements in construction, arrangement and mode of operation, all as I shall subsequently make plain by the following description. Before proceeding to a detailed description of the machine which I have selected for illustration as an embodiment of my invention, I should like it to be understood that the invention is capable of various other embodiments and also that various changes may be made in the illustrated machine without departing from the spirit and scope of my invention as defined in the claims. It should be further understood that the drawings are more or less conventional, and that the phraseology which I have employed is for the purpose of description and not of limitation.

Figure 2:
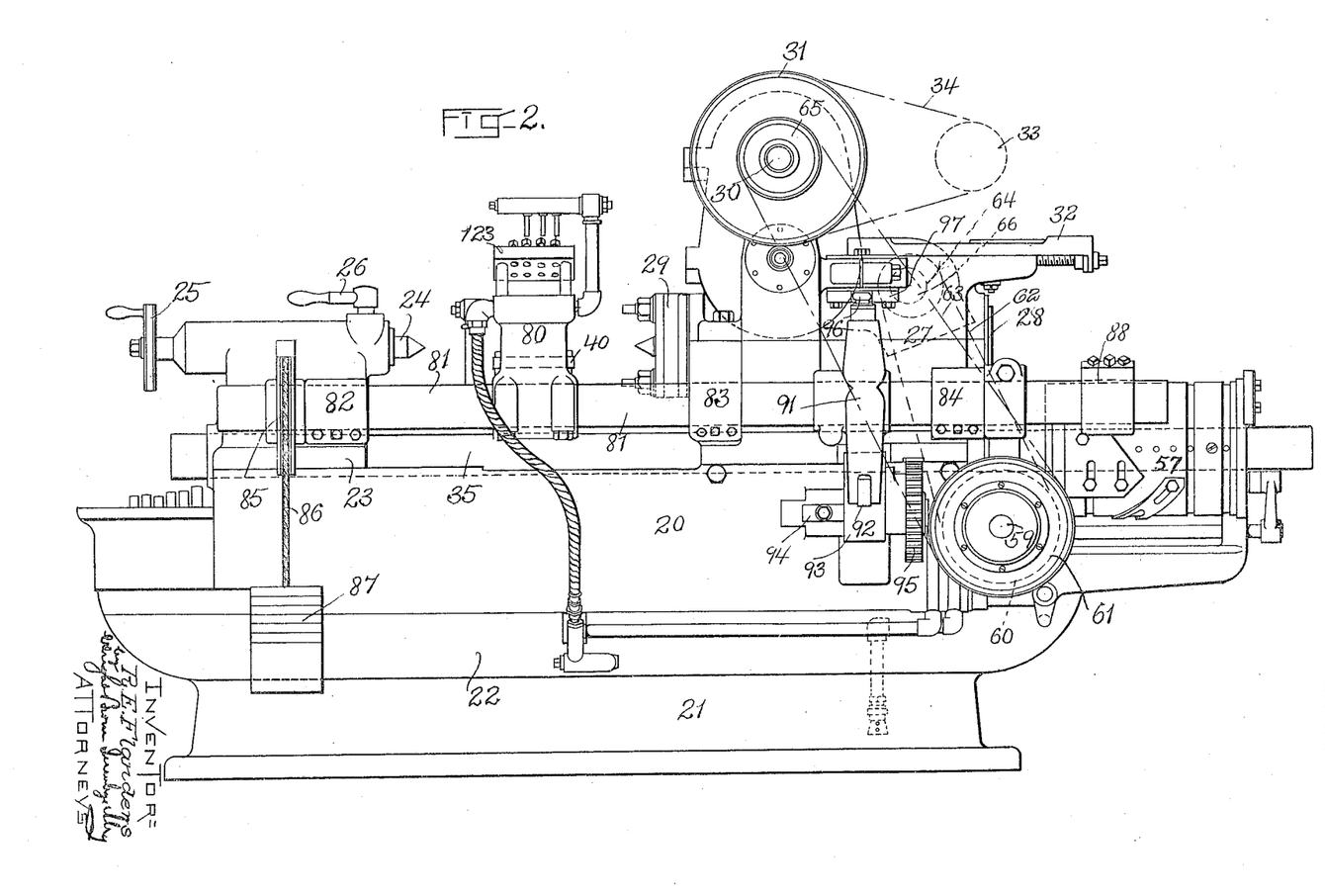
Fig. 2 illustrates the same in rear elevation.
Figure 3:
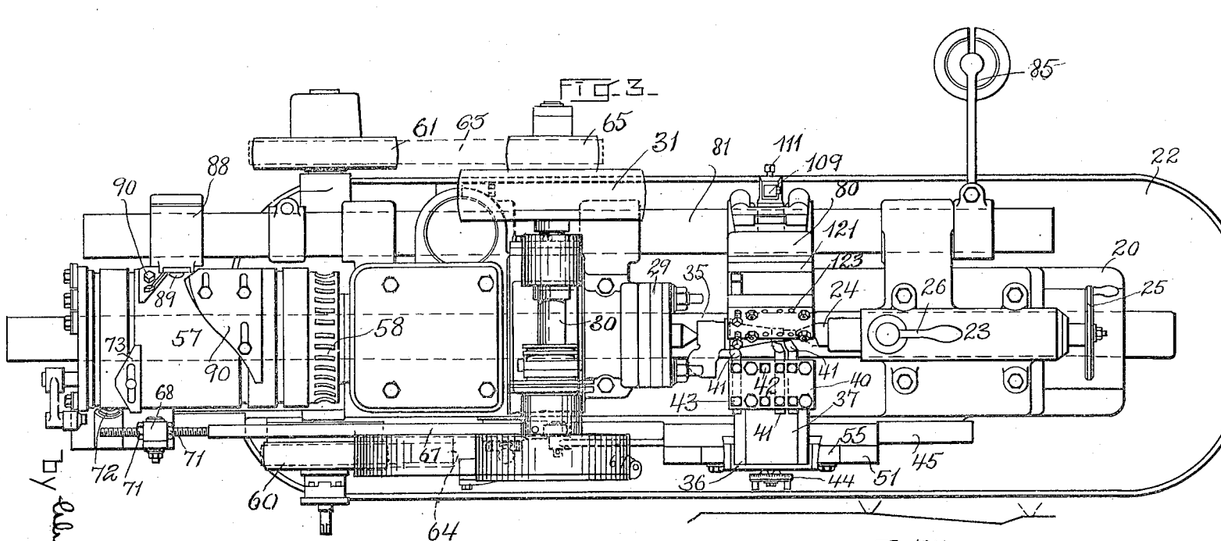
Fig. 3 represents a plan view of the machine.
Figure 4:
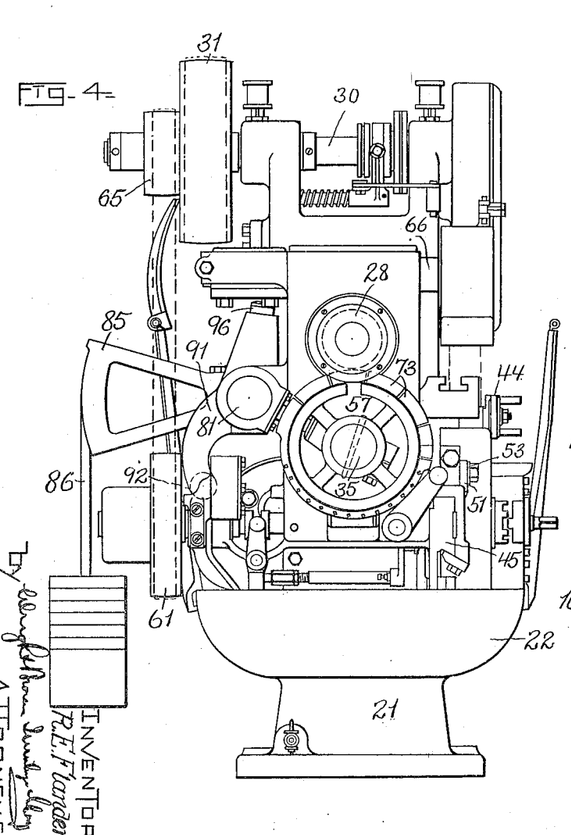
Fig. 4 represents an end elevation of the machine.

On the drawings, the machine is illustrated as comprising a bed 20 having a base 21 equipped with a pan 22. Upon suitable ways formed upon the bed may be secured the tailstock 23 having the tail center 24 which is adjusted by the rotation of the wheel 25 and which may be clamped after adjustment by a suitable clamp operated by the handle 26. Affixed upon the other end of the bed there is the headstock 27 having journaled therein a work-carrying spindle 28 provided at its end with a suitable chuck or work-holder 29. Through mechanism which need not be described in detail, power is imparted to the live spindle to rotate it at any predetermined number of revolutions per minute, any convenient variable-speed power-transmitting mechanism for this purpose being interposed between the main drive shaft 30 and said spindle. The drive shaft 30 is provided with a pulley 31 to which power may be applied either from a countershaft or else from an individual motor which may be located upon a base 32 placed on the top of the headstock, as indicated in Fig. 2. In said figure, the motor-driven pulley is indicated at 33 and the belt from which the power is applied to the pulley 31 is indicated at 34.

Figure 5:
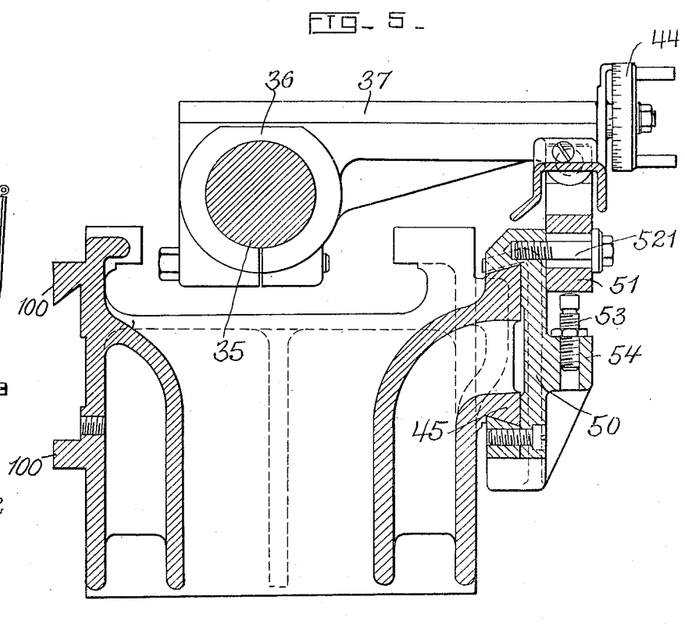
Fig. 5 shows a partial cross section on the line 5—5 of Fig. 1.
Figures 8, 9, 10, 11, 12, 13, 15:
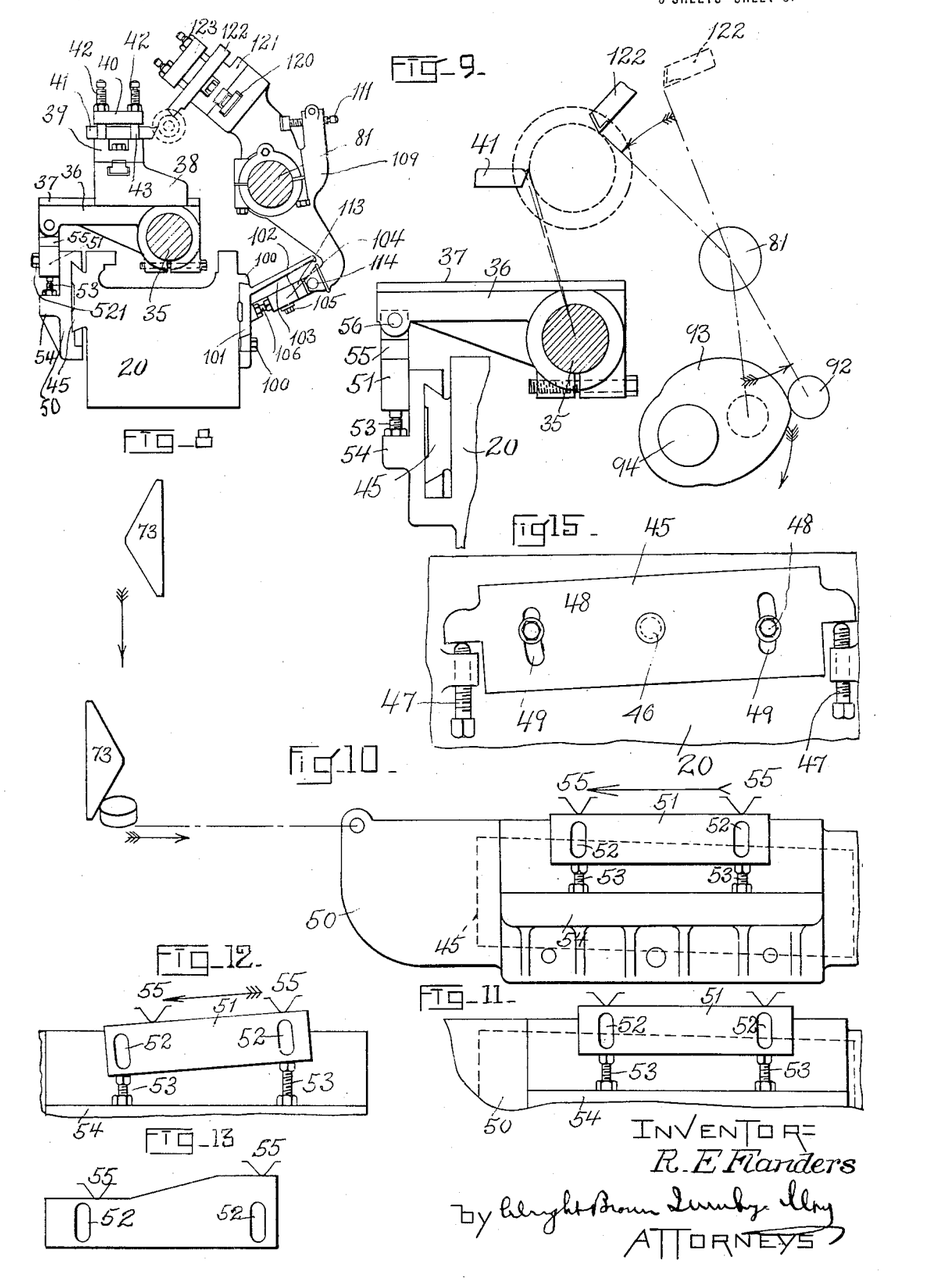
Fig. 8 shows, somewhat conventionally, a cross section through the machine so as to illustrate both tool holders.
Fig. 9 is a diagrammatic illustration of the movement of the cutters toward and from the work axis.
Figs. 10 to 13 inclusive illustrate what I may term the "backing off" mechanism for the front tool and tool holder, the two cam strips 73, 73, being a part of Fig. 10.
Fig. 15 shows an adjustable guideway on the bed for the former-slide or support.

As has been stated, the tool carriers are mounted upon bars which are arranged not only to move axially but also to rock about their axes. One of these bars is indicated at 35, and its ends are journaled in the bed. Its axis may be located in the vertical plane of the axis of the work spindle and the tail center, as shown. Adjustably clamped on said bar 35 there is a tool carrier 36. As shown in Figs. 5 and 8, the tool carrier has an extension which projects forwardly beyond the front wall of the bed, at right angles to the axis of the bar 35. The carrier 36 is provided with an undercut tongue or guideway 37 to receive a slide 38 which has a complemental groove on its underside and which may be adjusted longitudinally of the tongue by any suitable mechanism operated by a wheel 44. The slide 38 has provisions for the reception of a tool holder 39. The tool holder may be of any suitable or usual type. As shown, it consists of a block having a top plate 40 between which and the body thereof may be introduced one or more cutters 41. Clamping screws 42 pass through the plate 40 and serve to clamp the cutters rigidly in place, said plate itself being supported by posts 43. The tool holder 39 is adjustable lengthwise of the axis of the bar 35, whereas the slide 38 is adjustable in lines transverse to the axis of said bar. By means which I shall subsequently explain, the bar 35 is reciprocated axially to feed and withdraw the cutters which are supported upon the slide 38 and the tool carrier 36.

Figure 1:
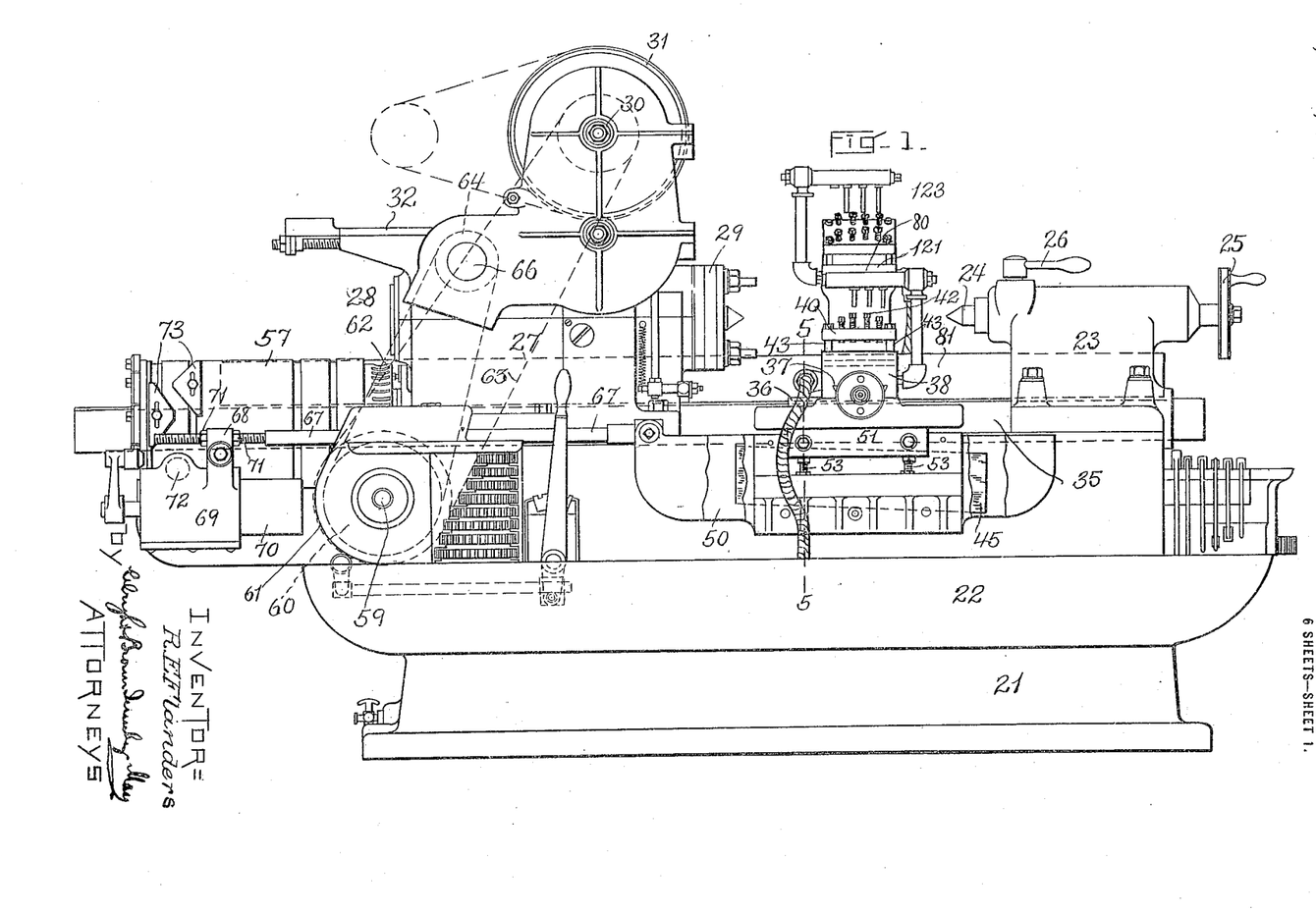
Figure 1 illustrates in front elevation a machine embodying my invention.

The tool carrier 36 is laterally controlled as to position during its feeding and withdrawing movements by a templet or former upon which the free end of the extension rests and which is supported upon the bed of the machine. By employing formers of different shapes, I am able to turn straight cylindrical surfaces or to turn tapers, so to form beveled or curved surfaces, as may be desired. Also, by laterally moving the templet i. e., in the present case by raising and lowering the templet, I am able to move the cutters into engagement with the work before beginning the feeding stroke, and to back the cutters away from the work before beginning the withdrawing stroke of the tool carrier. This mechanism which I am about to explain constitutes one of the important features of the present invention. By inspection of Figs. 5 and 10, it will be observed that, on the exterior of the front wall of the bed, there is provided an inclined or angular undercut guideway or tongue 45. This guideway may be either integral with the front wall of the bed, as shown in Fig. 1, or it may be adjustably secured thereto. For instance, in Fig. 15 I have shown how the guideway may be pivoted at its center upon a stud 46, in which case I employ adjusting screws 47 for engaging the ends thereof to adjust it about its center. After adjustment, it may be secured in place by setscrews 48 passed through curved slots 49 into the front wall of the bed. As shown in Figs. 5 and 10, however, the guideway 45 is integral with the front wall of the bed, and it is inclined downwardly toward the tail end of the bed, for a purpose to be described.

Mounted to slide on the guideway there is a slide or former-support 50, which is movable lengthwise of the bar 35 and of the axis of the work spindle. This slide has provisions for the reception of interchangeable formers or templets, of which one is indicated at 51. Each templet is preferably provided with transverse elongated slots 52 through which clamping screws 521 may be passed into the slide 50, so that the templet may be arranged either horizontally or inclined thereto as shown in Figs. 10 and 12. The provision of the slots, however, permits a bodily vertical (i. e. lateral) adjustment of the templet as illustrated in Fig. 11. To assist in the adjustment of the former, I provide abutment screws 53 which are screwed into vertical threaded apertures in a flange 54 extending forwardly from the slide. The under side of the templet rests upon the heads of these screws, so that by rotating them in one direction or the other, the templet may be adjusted to different angular positions or may be adjusted as to height.

The free end of the tool carrier projects forwardly and over the templet, as shown in Fig. 9, and it is provided with a V-shaped shoe 55 which rests upon the upper side or top of the templet. This shoe is mounted on a pivot or pintle 56 which is parallel with the former, so that the shoe can adjust itself to the different conditions resulting from the adjustment of the templet or former. From this description it will be apparent that, as the tool carrier is fed longitudinally of the work spindle, the cutters carried thereby will be accurately guided by the templet and will be caused to turn a straight cylinder, or to turn a taper, or a shoulder, according to the character and adjustment of the templet. Form example, in Fig. 13, I have shown a templet which will cause the cutter to turn first a straight cylindrical surface, then a tapering surface, and then a straight cylindrical surface during one feeding movement of the tool carrier. The different positions of the shoe are indicated at 55.

I will now explain how the slide 50 may be moved on its inclined guideway, thereby to move the former or templet laterally, and either advance the cutters to working position or to back them away therefrom. This is accomplished by means of cams located on a cam drum which is indicated at 57 and which is located at the head end of the machine. It is journaled in the headstock and is in axial alinement with the bar or shaft 35 which passes through it. The drum is driven by any suitable mechanism, being preferably formed or provided with a worm wheel 58 driven by a worm (not shown) on a shaft 59. The worm on the shaft is driven at either of two different speeds so as to impart a slow advancing movement of the tool carriers and a rapid return movement. It is unnecessary to describe the mechanism by which this is accomplished, except to state that for this purpose the shaft 59 has on its two opposite ends pulleys 60 and 61 which are respectively driven by belts 62, 63 from pulleys 64, 65. The pulley 64 is on a shaft 66 which is driven at slow speed, whereas the pulley 65 is on the main power shaft 30. Hence, when the worm is driven from the pulley 61, it rotates at high speed, and when it is driven from the pulley 60, it rotates at slow speed. Suitable automatic clutch mechanisms are provided for connecting and disconnecting the two pulleys 60 and 61 with the worm, but, as their construction and arrangement and their associated parts have no intimate connection with the present subject-matter, they need not be described.

The slide 50 has pivoted thereto one end of a rod 67, the other end of which is threaded and which is passed through a lug 68 on a slide 69 mounted to move on a guideway 70 supported by the bed. Two nuts 71, 71 on the threaded end of the rod 67 afford means for securing relative adjustment of the slide 69 and the rod 67 and for securing the rod to the slide after adjustment. The slide 69 is provided with a roll 72 adapted to be engaged by adjustable cams 73 on the drum 57. When the slide 69 is moved to the right in Fig. 1, the templet-carrying slide 50 is also moved to the right down the inclined guideway so as to move the templet laterally or downwardly to permit the free end of the tool carrier 36 to drop, thereby rocking the cutters away from the work. On the other hand, when the templet-carrying slide 51 is moved to the left to raise the templet or move it laterally in the opposite direction, the cutter carrier is rocked to carry the tools into engagement with the work. The cams are so set on the drum that the tools are rocked into proper working position before the tool carrier starts cutting feed, and so that the tool carrier will be rocked in the opposite direction to back the cutters away from the work before the tool carrier is retracted or moved in the opposite direction. By the provision of the adjustable guideway, which I have indicated in Fig. 15, a greater or smaller lateral movement of the former or templet may be secured, and in addition the operation of the tool carrier may be reversed, this being essential at times in turning certain kinds of work, as for instance shrapnel cases, or shells, in which the conical end is secured to the work holder.

In addition to the tool carrier which I have thus explained, there is still another tool carrier which I term the "rear tool carrier" and which is indicated at 80, see Fig. 2. This carrier may be firmly clamped to a cylindrical bar 81 which is movable axially and also about its axis. This bar is journaled in bearings 82 supported by the tailstock and by bearings 83, 84 supported by the headstock. On one end it is provided with a grooved segment 85 to which is secured a cable 86 carrying a weight 87. At its other end the rod is provided with a collar 88 provided with a roll 89 for engagement by cams 90 adjustably secured upon the cam drum. Through the medium of the cams and the collar, the bar or shaft 81 may be reciprocated axially. The collar is so located, however, that the shaft may be rocked through a relatively small arc without affecting the coöperation of the cams 90 and the roll 89.

Figure 6:
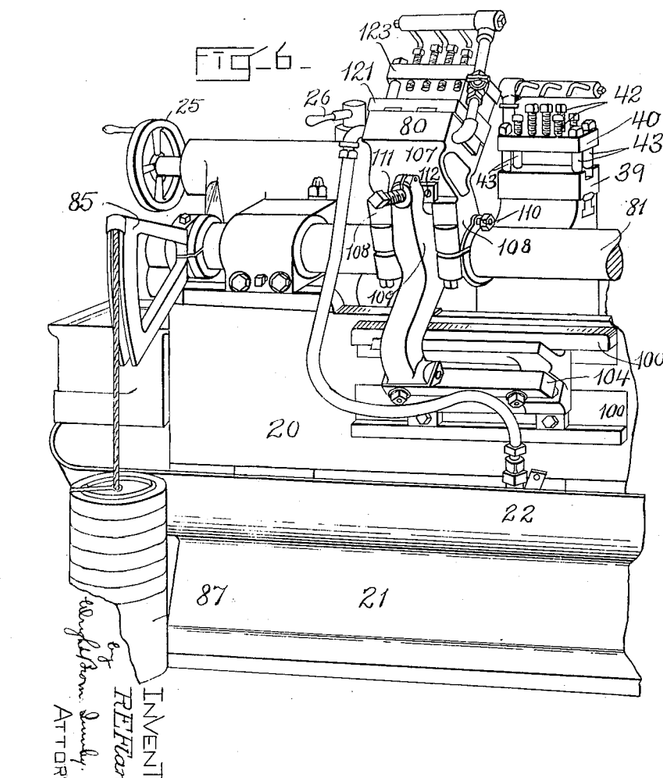
Fig. 6 represents a perspective view of a rear portion of the machine and shows a guiding templet for the rear cutter.
Figure 7:
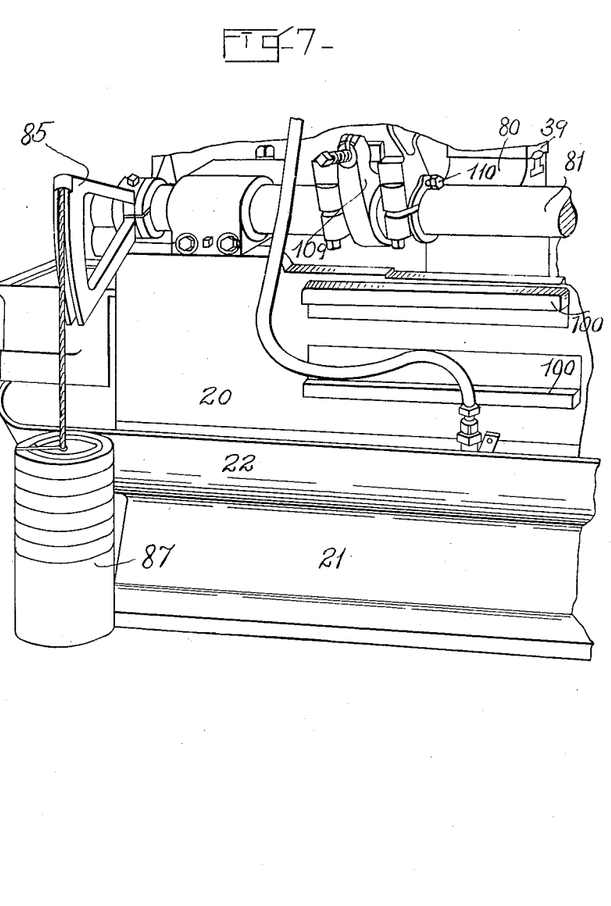
Fig. 7 is a similar view but with the templet and its associated parts omitted.

A two-armed lever 91 is secured to the bar 81, its depending arm being provided with a roll 92 bearing against a heart-shaped cam 93, as conventionally illustrated in Fig. 9. This cam is journaled upon a fixed shaft 94 and is formed or provided with a gear wheel 95 intermeshing with a gear of the same size (not shown) affixed to the inner end of the cam drum 57. The upwardly extending arm of the lever 91 is provided with a roll 96 located in a path or groove formed in a rotatably adjustable guideway 97. When the guideway is set at right angles to the longitudinal lines of the machine, the bar 81 will be rocked by the rotation of the cam 93 but not permitted to move endwise. When the guideway 97 is moved through an arc of ninety degrees, so that the guideway is parallel with the longitudinal lines of the machine, the roll 92 will be disengaged from the heart-shaped cam, and the bar 81 may be reciprocated only. If desired, the guideway 97 may be set at an angle to rock the bar as it is being fed lengthwise by the cam drum, or to feed the bar when it is being rocked by the cam 93, which is sufficiently wide for the purpose. This mechanism is explained in the Letters Patent to Fay No. 910,466, to which I previously referred. According to the present invention, in addition, I may employ a templet or former mechanism for controlling the operation of the bar 81 and the tool carrier thereon by means of which I am able to both feed and rock the bar 81 whereby I may accomplish either taper turning or the turning of curved surfaces upon the work. The mechanism for accomplishing this result is shown in Figs. 6, 7, 8 and 9. The rear wall of the bed is provided with parallel ribs 100 thereby affording a grooved guideway for a templet holder 101. This holder has a forwardly projecting apron 102 as shown in Fig. 8, and also has a flange 103 which is inclined both to the vertical and horizontal for the reception of any one of a series of interchangeable templets, one of which is indicated at 104. The templets may be substantially identical with those indicated at 51, and they are similarly held in place by screws 105 passed through transverse elongated slots into the flange 103. The templet 104 may be adjusted by adjusting screws 106 like those at 53. In this case, the tool carrier 107 is bifurcated and has two arms 108 which are spaced apart and which may be firmly clamped to the bar 81 as shown in Fig. 6. Between these arms there is mounted upon and secured to the bar 81 the hub of a lever 109. Said lever is narrower than the distance between the two arms 108, and the tool carrier may be adjusted relatively thereto axially or lengthwise of the bar 81 by adjusting screws 110 passed through the arms 108 and bearing against the lever 109. The upwardly projecting arm of the lever 109 is provided with an abutment screw 111 the inner end of which bears against a hardened block 112 secured to the rear side of the tool carrier 107. By the means just described, the tool carrier may be adjusted rotatively or around the axis of the bar 81 and may be also adjusted lengthwise of said bar. The depending arm of the lever 109 is angular, as shown in Fig. 8, and on its end it carries a shoe 113 which is pivoted thereto by a pintle 114, the axis of which is parallel with the axis of the bar 81. This shoe rides upon the face of the templet 104. The shoe is held against the templet by the pull of the weight 87 which is hung from the segment 85 as has been explained.

From the foregoing description it will be seen that, as the bar 81 is reciprocated by the cams on the cam drum, the cutters will be guided during their reciprocation by the former 104. If desired, the former-holder 101 may be set in an inclined guideway, and it may be moved longitudinally to rock the tools toward and from the work by mechanism substantially identical with that used in connection with the front slide 50. It will be understood that any suitable form of tool holder may be mounted upon the rear tool carrier. I have shown the tool carrier as being provided with a transverse guideway 120 so that a tool holder 121 may be secured thereon and may be adjusted lengthwise of the bar 81. The tool holder as shown is provided with one or more tools 122 held in place by clamping screws passed through a top plate 123 suitably secured to and forming a part of the tool holder. The machine is provided with means for supplying oil to the cutters, but, although such means are illustrated upon the drawings, they need not be described.

Figure 14:
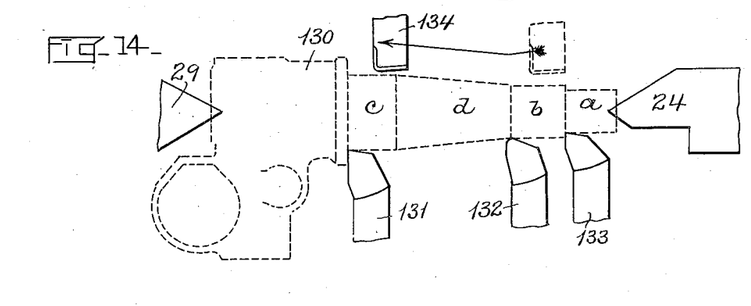
Fig. 14 illustrates the operation of the tools or cutters on a piece of work.

In Fig. 14 I have shown a piece of work undergoing a turning operation. It is indicated in dotted lines at 130, and it is held between the centers 24 and 29. The tools 131, 132 and 133 are mounted in the front tool holder and they turn the three cylindrical portions $a$, $b$ and $c$ of different diameters. A single tool 134, which is mounted upon the rear tool holder, is utilized for turning the tapering portion $d$, the rear tool carrier in this instance being controlled by a former or templet which is so adjusted as to cause the cutter to move away from the axis of the work as it is fed and thus turn the tapering portion $d$ of the work.

I have not explained the mechanism by which the rocking bar or shaft 35 is fed lengthwise. It is merely sufficient to state that it carries on its left end in Fig. 1 a roll (not shown) which is engaged by a cam mounted in the interior of the cam drum 57. A full description of the operation and an illustration of these parts may be found in the Letters Patent to which I have previously referred.

The machine may be employed for facing, as well as for straight turning, tapering or crowning operations, and, if desired, it may be employed with bar stock, as set forth in said Letters Patent to Fay.

Having thus explained the nature of my said invention, and described a way of making and using the same, although without attempting to set forth all of the forms in which it may be made or all of the modes of its use, what I claim is:

1. A metal-working machine, comprising an oscillatory tool carrier, a support therefor, means for reciprocating said tool carrier longitudinally of its axis, a former or templet arranged longitudinally of the axis of said tool carrier for controlling the movement of the carrier about its axis, and mechanism for automatically moving said former at the end of each longitudinal movement of the tool carrier to oscillate said carrier about its said axis and thereby to move the tool carried thereby toward and from the work.

2. A metal-working machine, comprising a work spindle, a tool carrier capable of oscillation about an axis substantially parallel with that of the work spindle, a tool slide adjustable lengthwise of said carrier, a tool holder on said slide, a former arranged longitudinally of said axes and coacting with said carrier to control the oscillatory movement of the tool carrier, means for reciprocating said carrier axially relatively to said former, and mechanism for moving said former to rock the carrier about its axis, so as to engage the tool and disengage it from the work at the ends of the axial movements of the tool carrier.

3. A metal-working machine, comprising a bed having an inclined guideway, a work spindle, a former supported by the guideway on the bed, a tool carrier engaged with the former, mechanism for supporting said carrier whereby it is capable of oscillation about an axis longitudinal of said spindle, mechanism for automatically reciprocating said carrier lengthwise of its axis and relatively to said former, and automatic mechanism for moving said former longitudinally of said guideway to oscillate the carrier and thereby move the tool carried thereby toward and from the work held by the work spindle.

4. A metal-working machine, comprising a bed, a work spindle, a former longitudinal of the work spindle, a support therefor movable lengthwise of the bed and arranged to move said former laterally, an inclined guideway on the bed for said support, a tool carrier engaged with said former and adapted to rock about an axis longitudinally of the work spindle, a cam drum, mechanism actuated by said cam drum for reciprocating the carriage, and mechanism actuated by said cam drum for moving said support along said guideway thereby to move said former laterally and to oscillate said tool carrier about its axis.

5. A metal-working machine, comprising a bed, a work spindle, a tool carrier mounted to reciprocate longitudinally of the work-spindle axis and adapted to oscillate about an axis substantially parallel with the spindle axis, a former engaged with the tool carrier, an angular or inclined guide-way on the bed extending lengthwise of the spindle axis, a slide thereon for supporting said former, mechanism for reciprocating the tool carrier, and mechanism for reciprocating said former-supporting slide.

6. A metal-working machine, comprising a bed, a work spindle, a tool carrier mounted to reciprocate longitudinally of the work-spindle axis and adapted to oscillate about an axis substantially parallel with the spindle axis, a former engaged with the tool carrier, an angular or inclined guideway, a slide thereon for supporting said former, mechanism for reciprocating the tool carrier, mechanism for reciprocating said former-supporting slide, said guideway being adjustable to different angular positions, and means for securing said guideway after adjustment.

7. A metal-working machine, comprising a bed, a work spindle, a tool carrier mounted to reciprocate longitudinally of the spindle axis and adapted to oscillate about an axis substantially parallel with the spindle axis, a former engaged with the tool carrier for controlling its oscillatory movements, a support for said former and adapted to move said former laterally of its length and thereby to rock said tool carrier about its axis, a slide mounted on said bed to move lengthwise of the spindle axis, an operative connection between said slide and said support for imparting operative movements from said slide to said support, and mechanism for automatically reciprocating said slide.

8. A metal-working machine, comprising a bed, a work spindle, an axially movable bar longitudinal of the work spindle, a former longitudinal of said bar, a tool carrier mounted on said bar capable of oscillatory movements about the axis of said bar, said carrier having a portion slidingly engaged with said former, mechanism for automatically reciprocating said bar and moving said tool rotatively to said former longitudinally thereof, an inclined guideway on the bed, a support for the former and movable on said inclined guideway to cause said former to move laterally and thereby to rock the tool carrier about its axis, and automatic mechanisms for reciprocating said bar and for actuating said support.

9. A metal-working machine, comprising a bed, a work spindle, a bar below and parallel with the spindle, automatic mechanism for longitudinally reciprocating said bar, a carrier secured upon said bar and projecting forwardly therefrom, a slide on the upper face of said carrier, a tool holder on said slide, a longitudinal inclined guideway on the front face of the bed below the tool carrier, a support movable along said guideway, a removable former slidingly engaged by the tool carrier and secured upon said support, and automatic mechanism for reciprocating said support longitudinally of the guideway.

10. A metal-working machine, comprising a bed, a work spindle, a bar below and parallel with the spindle, a carrier secured upon said bar and projecting forwardly therefrom, a slide on the upper face of said carrier, a tool holder on said slide, a longitudinal inclined guideway on the front face of the bed below the tool carrier, a support movable along said guideway, a removable former slidingly engaged by the tool carrier and secured upon said support, a cam carrier for longitudinally reciprocating said bar, a slide on said bed movable longitudinally of said bar, an adjustable operative connection for connecting said slide and said support, and cams on said carrier for longitudinally reciprocating said slide.

11. A metal-working machine, comprising a bed, a work spindle, a main tool carrier, a bar longitudinal of the bed, a rear tool carrier supported on said bar, an elongated guideway formed on the rear wall of the bed, a former consisting of a bar longitudinal of the bed, a support therefor in said guideway, an arm secured to said bar and movable along said former, and means for axially reciprocating said bar.

12. A metal-working machine, comprising a bed, a work spindle, a main tool carrier, a bar longitudinal of the bed, a rear tool carrier supported on said bar, an elongated guideway formed on the rear wall of the bed, a former consisting of a bar longitudinal of the bed, a support therefor in said guideway, an arm secured to said bar and movable along said former, means for axially reciprocating said bar, and means for adjusting said carrier rotatively and axially relatively to said arm.

In testimony whereof I have affixed my signature.

RALPH E. FLANDERS.